July 2, 1963 — T. I. DAVENPORT — 3,096,388
PHOTOELASTIC TRANSDUCERS
Filed Nov. 16, 1960 — 2 Sheets-Sheet 1
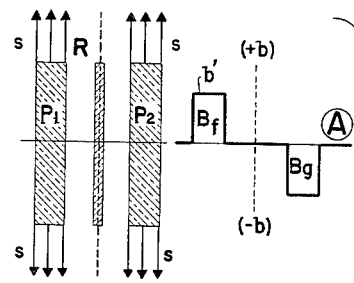
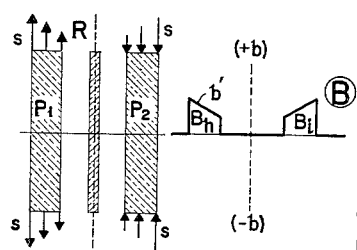
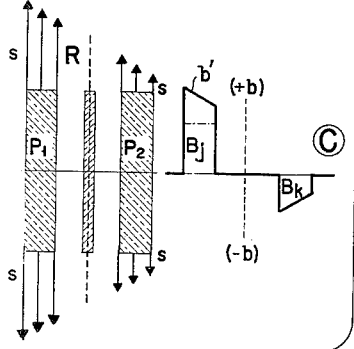
FIG. 5
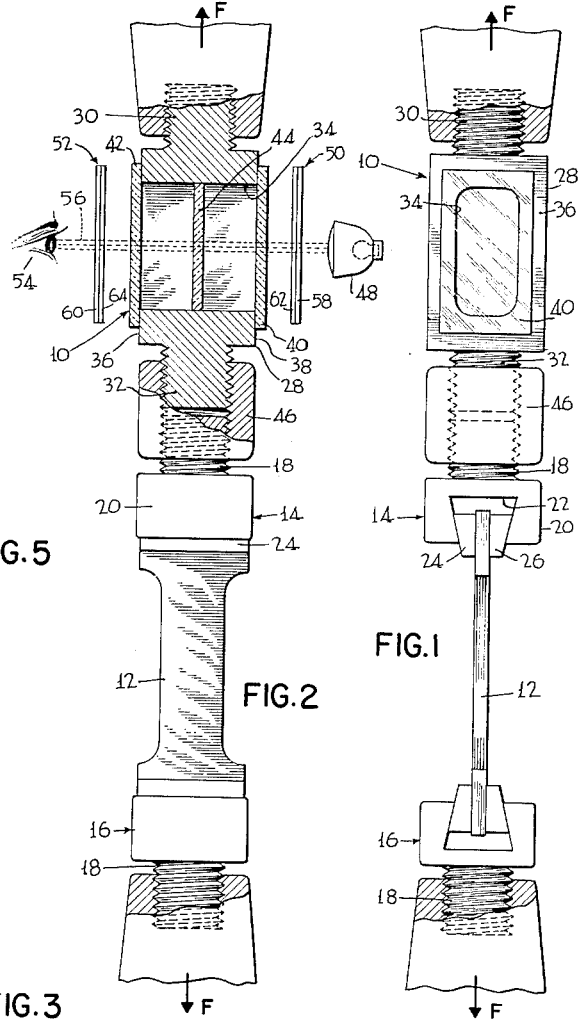
FIG. 2
FIG. 1
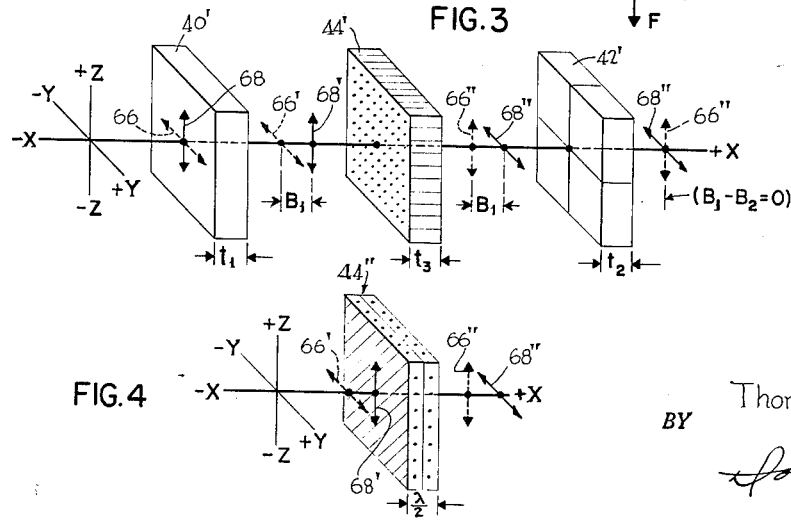
FIG. 3
FIG. 4
INVENTOR.
Thomas I. Davenport
BY
ATTORNEY July 2, 1963 — T. I. DAVENPORT — 3,096,388
PHOTOELASTIC TRANSDUCERS
Filed Nov. 16, 1960 — 2 Sheets-Sheet 2

INVENTOR.
Thomas I. Davenport
BY
ATTORNEY

United States Patent Office 3,096,388
Patented July 2, 1963

1

3,096,388
PHOTOELASTIC TRANSDUCERS
Thomas I. Davenport, Ambler, Pa., assignor to The Budd Company, Philadelphia, Pa., a corporation of Pennsylvania
Filed Nov. 16, 1960, Ser. No. 69,581
11 Claims. (Cl. 88—14)

This invention pertains to photoelastic transducers particularly for the determination of applied bending loads.

Conventional photoelastic transducers comprise a layer of a homogeneous photoelastic material which is loaded directly or indirectly by the forces or strains to be measured. The photoelastic material generates birefringence, visualized by interference fringe patterns produced in transmitted polarized light, as a function of the imposed loads. The contribution to birefringence along an increment of the path of the transmitted light is related in magnitude and sign to the internal principal stress-difference acting normally of that increment.

The net or visible birefringence produced by conventional transducers is the algebraic sum of the increments of birefringence contributed along the total path length of transmitted light and such birefringence cannot be interpreted to distinguish normal bending from normal tensile loadings.

As used herein, normal tensile loading refers to a transducer loading which produces a constant principal stress-difference along the path of light transmitted normally of the layer of photoelastic material; and normal bending refers to a loading which produces a linear stress-difference gradient along a similar light path. The slope of the internal principal stress-difference gradient in the plane of a light ray transmitted normally through a photoelastic layer is a measure of the bending component of the applied load; if this slope is zero, the applied load is a pure tensile load.

The general object of this invention is, therefore, to provide an improved photoelastic transducer yielding indications related directly to imposed bending loads.

According to illustrated embodiments, the photoelastic transducers of this invention comprise first and second strata of a forced-birefringent material, and an optical means oriented between the strata rotating planes of polarization of polarized light transmitted between the strata through an angle equal to 90°, whereby the net birefringence produced by the indicator is directly related to a bending deformation of the transducer.

Further explanation of the invention, together with additional objects and advantages thereof, will be had upon consideration of the following specification taken in conjunction with the accompanying drawings wherein:

FIG. 1 illustrates a photoelastic transducer according to this invention as applied for detection of anomalous bending during tensile test loading of a workpiece;

FIG. 2 is a side view of the apparatus of FIG. 1 with the transducer shown in cross section together with a polarized light system;

FIG. 3 illustrates a type of optical rotator means usable in the transducer of FIGS. 1 and 2;

FIG. 4 illustrates an alternative type of optical rotator means;

Figure 6:
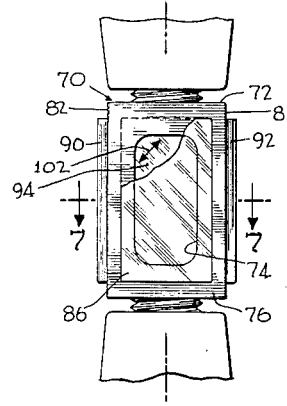

FIG. 5 comprises diagrams useful in explaining operating principles of the transducers of this invention;

FIG. 6 illustrates a modification of the transducer of FIGS. 1 and 2;

2

Figure 7:
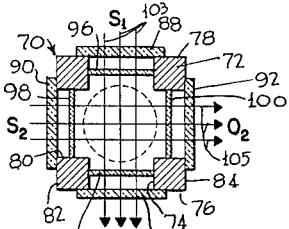
Figure 8:
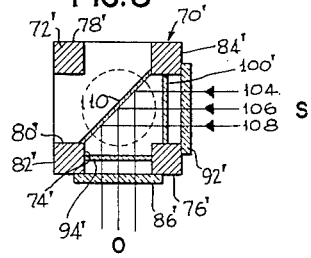
Figure 9:
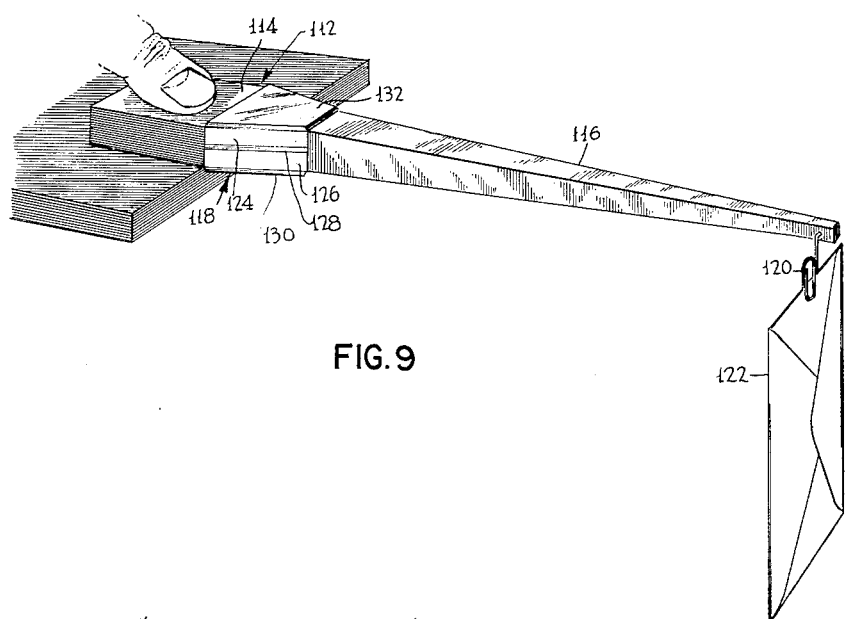
Figure 10:
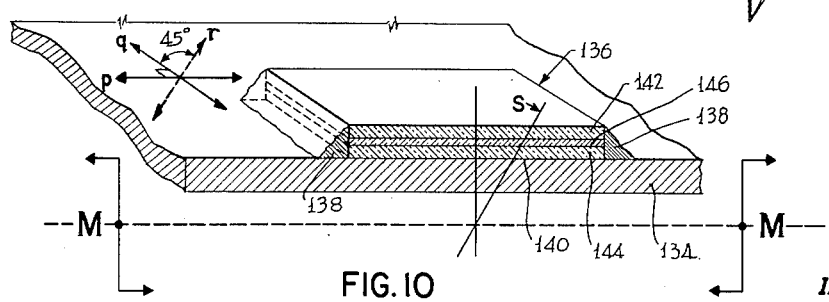

FIG. 7 is a cross section plan view of the transducer of FIG. 6;

FIG. 8 is a cross section plan view illustrating further modification of the transducer of FIG. 7;

FIG. 9 illustrates a weighing device incorporating a transducer according to this invention; and FIG. 10 illustrates application of an embodiment of the transducer of this invention as a bending-strain gauge.

With particular reference to FIG. 1, a transducer 10 according to this invention is shown coupled in series with a sheet metal work piece 12 during a tensile load test under a programmed tensile load F applied by a conventional testing machine, not shown.

Test specimen 12 is positioned by grips 14 and 16, each having an integral threaded boss 18, a jaw holder 20 formed with an inwardly expanding tapered bifurcation 22, and complementary tapered jaws 24 and 26. Transducer 10 is especially adapted for the indication of lateral bending load components and comprises a strut 28 shaped to define integral threaded bosses 30, 32 and a lateral bore 34 extending between parallel surfaces 36 and 38. First and second similar photoelastic material strata 40 and 42 overlaying bore 34 are integrally attached to surfaces 36 and 38, as by adhesive bonding. A functionally unique optical rotator means 44 is interposed between and parallel with strata 40 and 42 to rotate through 90° the planes of polarization of polarized light components transmitted between strata 40 and 42. Transducer 10 is coupled serially with workpiece 12 by coupling 46.

Conventional auxiliary apparatus for producing and analyzing polarized light may comprise light source 48, polarizer 50, and analyzer 52. An observation position is represented at 54 and normal transmitted light paths are represented at 56. The polarizer and analyzer may be plain polarizers or may each comprise plain polarizers 58, 60 and quarter wave plates 62, 64 as is conventional for the production and analysis of circularly polarized light.

FIG. 3 is a schematic illustration of the function of optically active rotator means 44 of FIGS. 1 and 2. Here, the rotator is a stratum 44' sliced from an optically active material normally of the direction of its optic axis, indicated by the shading lines. An optically active material such as quartz rotates the plane of polarization of incident plane polarized light transmitted parallel with the optic axis through an angle which is a function of the material's specific rotation and thickness and of the wave length of the light. For the nearly monochromatic yellow light of a sodium vapor source, a quartz stratum 4.15 mm. thick is indicated for the 90° rotation prescribed according to this invention.

Strata 40' and 42' represent the similar photoelastic strata 40 and 42 of the FIG. 1 transducer when subjected to a uniform tensile load parallel with the ZZ direction. The maximum and minimum principal stress-directions within both strata are respectively parallel with the ZZ and YY directions, and the principal stress-differences are constant. The surfaces of strata 40' and 42' and of rotator 44' are parallel with the YZ plane and perpendicular to the propagation direction of light transmitted along the XX direction from left to right.

Light incident upon stratum 40' is resolved by the stressed photoelastic material into two plane polarized components—a first component plane polarized in the XY plane, represented by the dashed vector 66; and a second component plane polarized in the XZ plane, represented by the solid vector 68. During transmission through each incremental thickness of the photoelastic stratum, one of the components is retarded relative to the other by an amount per unit transmission distance proportional to stress-difference, or to tension along ZZ if the minimum principal stress along YY is zero or a constant.

For the purposes of this explanation, birefringence and retardation are used synonymously since the former is the visible consequence of, and is directly related to, the latter. Further, the plane of the greater tensile (lesser compressive) stress is designated as the slow plane and the plane of the lesser tensile (greater compressive) stress, as the fast plane although the optical relationship may reversed for some photoelastic materials. In FIG. 3, the slow and fast planes are, respectively, the XZ and XY planes. The incremental birefringence is designated by the variable $b_1$ for stratum 40', and the total retardation produced upon transmission through stratum 40' as $B_1$, according to:

$$B_1 = \int_0^{t_1} b_1 dx \qquad \text{I}$$

where $t_1$ is the thickness of stratum 40', and $b_1$ is a function of $x$ or a constant. The total retardation $B_1$ is represented by the plotted distance between dashed and solid arrows 66' and 68'.

Since the condition of stratum 42' is identical to that of stratum 40', it will produce between light components polarized parallel with the XY and XZ planes a total birefringence $B_2 = B_1$. Rotator 44', however, rotates plane polarized component 66' from the XY plane into the XZ plane and rotates the component 68' from the XZ plane into the XY plane so that, in effect, the emergent components 66" and 68" are transposed as to their planes of polarization without alteration of the birefringence. The component which was polarized in the slow plane during transmission through stratum 40', is now in the fast plane during transmission through stratum 42'; conversely, the component which was in the fast plane during transmission through stratum 40', is now in the slow plane for transmission through stratum 42'. Therefore, component 68" is retarded relative to component 66" by stratum 42' an amount equivalent to $B_2$, a birefringence equal in magnitude but opposite in direction to $B_1$, and upon emergence components 66''' and 68''' are undisplaced, or more generally, exhibit a relative retardation or birefringence condition unchanged from their original incidence condition.

FIG. 4 illustrates an additional example of an optical rotator means for incorporation in a photoelastic transducer according to this invention. Here, the rotator 44" is a stratum of a material which is permanently birefringent, such as quartz, but the stratum is cut parallel with the direction of the material's optic axis as indicated by the shading lines. Light transmission by rotator 44' is according to slow and fast polarization planes, parallel with and perpendicular to the indicated optic axis (i.e., the $z=y$ plane and the $z=-y$ plane respectively), and a relative retardation is developed between the components. However, the stratum thickness is specifically chosen to yield a relative retardation of one-half wavelength. Rotator 44' is, therefore, recognized as a half-wave-equivalent retardation plate or a so-called half-wave plate. As known in the art, the half-wave plate retardation produces a rotational effect R upon the plane of polarization of transmitted light of $(180° - 2\theta)$ when $\theta$ is the angle between the plane of polarization of incident light and the direction of the half-wave plate material's optic axis. For $\theta = 45°$, the rotation is 90°. Since light components 66' and 68' coming from a first transducer stratum are mutually perpendicularly plane polarized, the condition of $\theta = 45°$ may be satisfied simultaneously for both components. Thereupon, both components are rotated 90° upon transmission through half-wave plate 44" as indicated at 66" and 68" with the same result upon transducer action as produced by the optically active rotator 44' of FIG. 3.

While both the optically active rotator 44' of FIG. 3 and the half-wave plate rotator 44" of FIG. 4 perform advantageously in specific transducer applications according to this invention, each has its particular advantages and disadvantages. The rotation of the former is independent of the direction of the incident planes of polarization of the transmitted light, while the rotation of the latter is definitely dependent thereupon. Consequently, the half-wave rotator is practical only in applications where the directions of the maximum and minimum photoelastic stratum principal stresses are predictable. Conversely, the rotation of the half-wave plate is a second degree function of the wave-length of the incident light and, therefore, its auxiliary polarized light systems must employ monochromatic light which yields grey-scale fringe information, only, as opposed to the isochromatic fringe information obtainable with ordinary white light. The half-wave rotator is also dependent upon wavelength; but the dependence is linear and of small consequence over the restricted wavelength range of ordinary incandescent sources. The thickness of either rotator should, of course, be chosen for the mean wavelength of the light to be utilized in its application.

Both of the exemplary rotators are physically divisible without effect upon their rotary functions; that is, the indicated total thickness of a rotator may be achieved by two or more partial thickness layers, spaced apart or laminated together, so long as the prescribed optic axis directions are substantially maintained throughout the composite rotator. In some instances chromatic dispersion may be improved by the use of layers of different materials and the expedient of using two slightly relatively rotated quarter-wave plates to comprise a half-wave plate is well known for this purpose.

The diagrams of FIG. 5 explain the resolution of bending loads by the transducers of this invention. At A, B and C the photoelastic strata $P_1$ and $P_2$ are represented in cross section on opposite sides of a rotator R. Stratum internal stresses in the cross sectional plane are indicated by the magnitude and direction of the vectors $s$; stresses perpendicular to the cross sectional plane are assumed to be zero or a constant. Accompanying each stress diagram is a plot of differential birefringence $b'$ versus displacement $x$ along the direction of a transmitted light path XX. Since differential birefringence is proportional to stress, its curve is similar to the envelope of the stress vectors. Because of the transposition produced by rotator R, however, there is a sign change in the relationship between curve $b'$ and the stress vector envelope at opposite sides of rotator R. The areas defined by the $b'$ curves are each equivalent to an integral B, net birefringence, according to Equation I above.

Case 5A assumes pure tensile loading, zero bending stress gradient, so that the birefringence $B_f$ produced within stratum $P_1$ is eqaul in magnitude to the birefringence $B_g$ produced within the stratum $B_2$. The rotator R, however, causes tensile birefringence of stratum $P_2$ to be opposite in sign to tensile birefringence of stratum $P_1$, and their summation yields no net birefringence.

Case 5B assumes a pure bending load, relative to a central neutral surface, which is represented by a decreasing tensile stress gradient through $P_1$ and in increasing compressive stress gradient of the same slope through $P_2$. The effect of the rotator R is to cause the compressive birefringence $B_l$ of $P_2$ to have the same sign as the tensile birefringence $B_h$ of $P_1$. Since $B_h$ and $B_l$ are of equal magnitude, the net birefringence is twice that produced by either stratum $P_1$ or $P_2$.

Case 5C assumes a simultaneous application of the loadings of 5A and 5B so that stratum $P_1$ produces a birefringence $B_j = B_f + B_h$ and stratum $P_2$ produces a birefringence of magnitude $B_k = B_g - B_l$. Net birefringence, because of rotator R, is $$B_j - B_k = (B_f + B_h) - (B_g - B_l) = B_h + B_l$$

exactly that produced in case 5B.

In the absence of rotator R, the net birefringence for case 5B would be zero, hence no indication of the bending load, and the net birefringence of case 5C would be $B_j + B_k$ without any possibility of interpretation as to the contributions due to tensile or bending loading contributions.

It should be apparent, therefore, that the transducers of this invention are unique in that they yield indications related directly to normal bending loads and unaffected by the simultaneous application of normal tensile loads. In the application of FIG. 1, for example, transducer 10 indications would be of variations in the lateral bending of the workpiece 12. The magnitude of the indication being taken as equivalent to the magnitude of anomalous bending, corrective measures would be undertaken, their effect visualized, and the necessary adjustments accomplished to achieve desired tensile loading for the workpiece 12.

The visible birefringence produced by the transducer of FIG. 1 is not affected by bending loads parallel with the birefringent strata 40 and 42 because their effect at each normal cross section reproduces case 5A above; that is, duplicate normal-plane tensile (or compressive) stress patterns in both strata $P_1(40)$ and $P_2(42)$. Because of the transpositional effect of rotator $R(44)$, there is no net transducer birefringence produced by equal, similarly directed, stress gradients.

The modification illustrated in the elevation of FIG. 6 and the cross section of FIG. 7 provides for the visualization of bending loads in mutually perpendicular planes. Transducer 70 comprises a rectangular strut 72, similar to strut 28 of FIG. 1. Strut 72 is apertured to define a first bore 74, extending between parallel longitudinal surfaces 76 and 78, and a second bore 80, extending similarly between surfaces 82 and 84. Four similar photoelastic strata 86, 88, 90, and 92 are integrally attached, respectively, to surfaces 76, 78, 82 and 84 so as to overlap opposite ends of bores 74 and 80. Two composite rotators are provided for transducer 70: a first by layers 94, 96 within bore 74 parallel with strata 86 and 88; and a second by layers 98 and 100 within bore 80 parallel with strata 90 and 92. If the rotator is the optically active type, total thickness of each pair of layers 94—96 or 98—100 is prescribed as explained in connection with FIG. 3; if the half-wave type, each layer of a pair is conveniently a quarter-wave plate. For the latter type, the direction of the optic axis of the birefringent rotator material is oriented at an angle of 45° with the transducer axis as indicated by vector 102.

Net birefringence produced along light paths 103 between a light source $S_1$ and an observation position $O_1$ is directly related to bending normally of strata 86 and 88; and net birefringence produced along the light paths 105 between $S_2$ and $O_2$ is directly related to bending normally of strata 90 and 92. Observable birefringence along either direction is independent of axial tensile loading of the transducers 70, and depends directly upon bending loading only.

FIG. 8 is a cross section illustration of a further modification of the transducer of FIGS. 6 and 7. The transducer 70' comprises a strut 72' of the same configuration as strut 72 of transducer 70, with bore 74' and 80' formed therein as described above. In this modification, however, the photoelastic strata 86' and 92' are equivalent to strata $P_1$ and $P_2$ of the FIG. 5 schematic and are interposed normally of light paths 104, 106, 108, by means of a reflector 110 oriented at 45° with the strut surfaces. Rotator parts 100' and 94' are again interposed between strata 86' and 92' normally of light paths 104—108 and in combination are equivalent to one of the rotators of FIG. 2 and FIG. 3.

Again, equal tensile loads upon strata 86' and 92' result in cancelling birefringence contributions because of the plane of polarization transposition by rotator means 100'—94'. However, bending load components normal to either strata 86' or 92' cause a net birefringence directly related to the magnitude of the resultant of the bending components. Further, the relative net birefringence along paths 104—108 varies with and distinguishes the direction of the plane of the resultant bending.

In applications such as that of FIG. 1, the visualization of bending loads is for the purpose of their elimination. There are many applications in which visualization of a bending load is for measurement of a condition causing the bending. The transducer application of FIG. 9 illustrates an application wherein a weighing operation is scaled by means of birefringence related to bending.

The cantilever weighing scale 112 comprises a supporting portion 114, a bending load multiplication lever portion 116 and a serially interposed bending transducer 118. A clip 120 is provided at the end of lever 116 to receive an object to be weighed, a letter 122, for example. In use, supporting portion 114 is clamped against a horizontal surface so that transducer 118 and lever 116 deflect as a fixed-end cantilever beam.

Transducer 118 comprises first and second similar photoelastic strata 124 and 126 and an interposed rotator 128. In order for the scale to be usable with ordinary light, rotator 128 is preferably a half-wave plate and its optic axis is oriented at 45° with the longitudinal axis of the cantilever. Preferably, a reflecting surface 130 is provided contiguous with stratum 126 and a circular polarizer 132 is superimposed above stratum 124.

Polarizer 132 performs also as an analyzer in this system and the modulated light travels twice through the transducer. Since the birefringence effects are cumulative, net birefringence yields a doubly sensitive indication of bending load magnitudes.

The bending moments applied to the transducer vary linearly with distance from the point of load application and it may be desirable to taper the plan width of the transducer so that principal stress-difference is of constant magnitude throughout the length of the transducer. A single fringe will then be visible in ordinary light and its color will change as the applied load is varied. Selection of the thickness and material of the birefringent strata allows appearance of a predetermined fringe color, red for example, to signify that the load, letter 122, equals a corresponding predetermined weight.

FIG. 10 illustrates an embodiment of the transducer of this invention for indication of workpiece bending strains when gauging access is limited to but one side of the workpiece. The workpiece is represented as a large plate 134. Transducer 136 is attached to the workpiece by means of an interposed adhesive layer terminating in fillets 138. A reflecting surface 140 is interposed at the transducer-workpiece interface. Photoelastic strata 142 and 144 are integrally laminated with interposed rotator 146. Predetermined directions of the principal strains at the workpiece surface are indicated by the vectors $p$ and $q$ and the direction of the optic axis of rotator 146 is aligned parallel with the bisecting vector $r$ when a half-wave plate is employed.

A linear normal bending strain gradient is assumed to be developed within plate 134 as bending moments M are applied relative to a displaced neutral bending surface. Because transducer 136 is deformed concentrically with workpiece 134, a linear stress gradient S is projected through strata 144 and 146 reproducing the condition of case C of FIG. 5 above. As explained in connection with the schematic 5C, the net birefringence magnitude is directly related to the bending magnitude and, therefore, determinative of the workpiece bending strain.

In the embodiment of FIG. 10, the half-wave rotator lamina is exposed to considerable loading stresses and it therefore should be of minimum thickness to obviate forced-birefringent alternation of its permanent birefringence. In the previous embodiments, however, the rotator elements are easily isolated from induced stresses by flexible mounting means, of a sponge rubber or like material, for example.

Each of the transducers of FIGS. 1, 6, 8, 9 and 10, may be calibrated to relate observable net birefringence with bending loads, directly and quantitatively. Consider Equation I above in the form:

$$B = B_h + B_i = 2\int b' dt = 2\int k't dt = k't^2 \qquad \text{II}$$

The net transducer birefringence B is comprised of equal first and second stratum bending-related birefringences $B_h$ and $B_i$. Each of the latter is equatable with the integral, over the stratum thickness $t$, of the product of incremental birefringence $b'$ and light path differential length $dt$. Because of its linear increase with path length, $b' = k't$, where $k'$ is a slope proportional to the normal bending load acting on the transducer. Since $t$ is a measurable constant, the normal bending load L may finally be related to B by:

$$L = cB \qquad \text{III}$$

where $c$ is a characteristic constant empirically determinable for each transducer and tranducer loading condition.

Although the above descriptions of preferred transducer embodiments according to this invention have implied the use of photoelastic strata which are isotropic when unstressed, it should be apparent that other initial conditions may be prescribed since it is the change in transducer net birefringence which is determinative of bending. As an aid in scaling such changes, it will be often desirable that one or both photoelastic strata exhibit a preformed biasing pattern of birefringence upon which the bending induced birefringence is superimposed.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A photoelastic tranducer for use with polarized light for the resolution of bending components from axial components of a load applied to a workpiece, said transducer comprising two photoelastic strata, an optical rotator rotating planes of polarization of transmitted light through 90°, means attaching the strata to the workpiece imposing differing portions of the bending and equal portions of the axial load components upon said strata, and means directing said light normally of, and through, one said stratum, said rotator, and the other said stratum, in that order, whereby a net birefringence is produced in said light proportional to the bending load components.

2. A photoelastic transducer for use with polarized light for indicating bending produced by workpiece loading components paralleling a given direction, said transducer comprising two similar photoelastic strata and an optical rotator oriented parallel with said direction, said rotator interchanging directions of planes of polarization of light passing therethrough, means attaching the strata to the workpiece imposing differing bending and equal axial portions of said loading components upon said strata, and means directing said light normally of, and through, one said stratum, said rotator and the other said stratum in that order, whereby a net birefringence is produced in said light proportional to the bending produced by said loading components.

3. A photoelastic transducer for use with polarized light for indicating bending produced by workpiece loading components paralleling a given direction, said transducer comprising two similar photoelastic strata oriented parallel with said direction, means attaching the strata to the workpiece imposing differing bending and equal axial portions of said loading components upon said strata, said strata being comprised of a material responsive to said loading portions plane polarizing components of light transmitted therethrough in mutually perpendicular planes parallel and perpendicular to said direction, means directing said light normally of and through said strata, an optical rotator oriented parallel with said direction interposed between said strata normally of said light and interchanging directions of planes of polarization of the mutually perpendicularly plane polarized components of light passing therethrough, whereby a net birefringence is produced in said light proportional to said bending.

4. The transducer of claim 3 wherein said rotator is a half-wave plate of birefringent material having its optic axis oriented at substantially 45° with said direction.

5. The transducer of claim 3 wherein said rotator comprises two quarter-wave plates of birefringent material having its optic axis oriented at substantially 45° with said direction, one said quarter-wave plate being parallel with one said stratum and the other said quarter-wave plate being parallel with the other said stratum.

6. The transducer of claim 3 wherein said rotator is of an optically active material having its optic axis normal to said direction.

7. A photoelastic transducer for use with polarized light for indication of anomalous bending due to loading components parallel with a given direction, said transducer comprising a strut having an axis parallel with said direction and a pair of surfaces parallel with and equidistant from said axis, said strut being apertured to define a light passageway between said surfaces, a photoelastic stratum integrally attached to each said surface overlapping said passageway, and an optical rotator means oriented parallel with said axis and interposed within said passageway between said strata interchanging directions of planes of polarization of mutually perpendicularly plane polarized light components transmitted normally of said axis through one said stratum, said rotator, and the other said stratum.

8. The transducer of claim 7 wherein said surfaces are parallel.

9. A photoelastic transducer for use with polarized light for indication of anomalous bending due to loading components parallel with a given direction, said transducer comprising a strut adapted to receive said loading components and having an axis parallel with said direction, a first pair of parallel surfaces equidistant from a said axis, and a second pair of parallel surfaces equidistant from said axis and perpendicular to said first pair of surfaces, said strut being apertured to define a first passageway between said first pair of surfaces and a second passageway between said second pair of surfaces, a photoelastic stratum integrally attached to each of said surfaces overlapping said passageways, a first optical rotator means oriented within said first passageway parallel with and between said first pair of surfaces, and a second optical rotator means oriented within said second passageway parallel with and between said second pair of parallel surfaces, each said optical rotator means interchanging directions of planes of polarization of mutually perpendicularly plane polarized light components transmitted therethrough normally of said axis.

10. The transducer of claim 9 wherein said first and second rotators each include two quarter-wave plates of a birefringent material having its optic axis oriented at 45° with said direction.

11. A photoelastic transducer for use with polarized light for indication of anomalous bending due to loading components parallel with a given direction, said transducer comprising a strut having an axis parallel with said direction and a pair of perpendicular surfaces each parallel with and equidistant from said axis, said strut being apertured to defining a passageway between said surfaces, a photoelastic stratum integrally attached to each of said surfaces and overlapping said passageway, a reflector means parallel with said axis and equiangularly disposed with respect to said surfaces diverting normal incidence light transmitted through one said stratum into normal incidence with the other said stratum, and an optical rotator means interchanging the directions of planes of polarization of mutually perpendicularly plane polarized light components transmitted therethrough oriented within said passageway between said strata parallel with said axis and perpendicular to normal incidence light transmitted between said strata.

References Cited in the file of this patent

UNITED STATES PATENTS

| 2,625,850 | Stanton | Jan. 20, 1953 |
| 2,730,007 | Chapman | Jan. 10, 1956 |
| 2,766,659 | Baerwald | Oct. 16, 1956 |
| 2,780,958 | Wiley | Feb. 12, 1957 |

FOREIGN PATENTS

| 556,089 | Belgium | Apr. 15, 1957 |